United States Patent [19]

Fellinger

[11] Patent Number: 5,699,442

[45] Date of Patent: Dec. 16, 1997

[54] SYSTEM FOR DETECTING THE LOCATION OF A REFLECTIVE OBJECT WITHIN A VIDEO FIELD

[75] Inventor: David Fellinger, Westlake Village, Calif.

[73] Assignee: Andrew Welch, Venice, Calif.

[21] Appl. No.: 527,095

[22] Filed: Sep. 12, 1995

Related U.S. Application Data

[63] Continuation of Ser. No. 867,048, Apr. 10, 1992, abandoned.

[51] Int. Cl.$^6$ .............. G06K 9/00; G06K 9/36; G06K 9/52; G06K 9/38
[52] U.S. Cl. .............. 382/103; 382/291; 382/162; 382/206; 382/273; 348/169
[58] Field of Search .............. 382/103, 162, 382/203, 204, 206, 273, 291; 348/94, 138, 25, 29, 30, 135, 143, 590, 591, 592, 169–172

[56] References Cited

U.S. PATENT DOCUMENTS

| | | | |
|---|---|---|---|
| 3,584,142 | 6/1971 | Schoeffler | 178/6.8 |
| 3,840,699 | 10/1974 | Bowerman | 178/6.8 |
| 3,959,771 | 5/1976 | Uno et al. | 382/291 |
| 4,307,377 | 12/1981 | Pferd et al. | 340/146.3 |
| 4,315,282 | 2/1982 | Schumacher | 358/107 |
| 4,399,470 | 8/1983 | Hibbard | 358/284 |
| 4,424,587 | 1/1984 | Wavelsiep et al. | 382/291 |
| 4,430,526 | 2/1984 | Brown et al. | 178/18 |
| 4,435,835 | 3/1984 | Sakow et al. | 382/291 |
| 4,516,174 | 5/1985 | Kammoto | 358/282 |
| 4,533,937 | 8/1985 | Yamamoto et al. | 348/592 |
| 4,555,801 | 11/1985 | Miyagawa et al. | 382/291 |
| 4,562,593 | 12/1985 | Ooe et al. | 382/291 |
| 4,596,037 | 6/1986 | Bouchard et al. | 382/8 |
| 4,631,599 | 12/1986 | Cawkell | 358/285 |
| 4,636,838 | 1/1987 | Cosh | 348/592 |
| 4,673,988 | 6/1987 | Jansson et al. | 358/280 |
| 4,928,176 | 5/1990 | Schmidt et al. | 348/135 |
| 4,963,036 | 10/1990 | Drisko et al. | 382/50 |
| 5,046,163 | 9/1991 | Priest et al. | 358/94 |
| 5,063,603 | 11/1991 | Burt | 382/115 |
| 5,086,486 | 2/1992 | Yamada | 382/291 |
| 5,216,498 | 6/1993 | Matsumawa et al. | 382/48 |
| 5,222,154 | 6/1993 | Graham et al. | 382/18 |
| 5,335,297 | 8/1994 | Pullen | 382/49 |
| 5,369,265 | 11/1994 | Adachi et al. | 382/291 |
| 5,371,810 | 12/1994 | Vaidyanathan | 382/291 |
| 5,430,809 | 7/1995 | Tomitaka | 382/291 |

FOREIGN PATENT DOCUMENTS

40254107  12/1985  Japan ............... G02B 7/11

*Primary Examiner*—Leo Boudreau
*Assistant Examiner*—Bipin Shalwala
*Attorney, Agent, or Firm*—Blakely Sokoloff Taylor & Zafman

[57] ABSTRACT

A system for detecting the precise location of a reflective element in a video field wherein the determined location is subsequently utilized to generate a graphic to be added to a foreground video scene utilizing compositing techniques. A signal is generated specifying a precise point in the foreground video scene identifying a position of a reflective element. The signal is derived from a peak detector which generates a pulse whenever the signal input to the pulse detector is at a maximum level for the current video field being scanned so long as the scan is not in the blanking area. The pulse is used by a vertical line counter and a horizontal pixel counter which specify the line and pixel on a horizontal scan line within a video field representing the position of the highest peak generated within that field. Graphics can be repositioned or lines or other graphic elements can be generated which track the movement of the reflective element.

14 Claims, 6 Drawing Sheets

Fig. 6

SYSTEM FOR DETECTING THE LOCATION OF A REFLECTIVE OBJECT WITHIN A VIDEO FIELD This is a continuation of application Ser. No. 07/867,048 now abandoned filed Apr. 10, 1992.

SUMMARY OF THE INVENTION

A system is disclosed for detecting the precise location of a reflective element in a video field wherein the determined location is subsequently utilized to generate a graphic to be added to a foreground video scene utilizing compositing techniques well known in the art. The system has application in many situations wherein it is desired to generate an image which is a composite of a foreground and background video. For example, weather broadcasts frequently utilize a composite video image wherein the weather person appears in front of a backing (typically blue) and the background video source is a weather map with clouds, temperatures, cold fronts and other graphics which may be added to the weather map in a predetermined sequence. Frequently, the weather person points to a position on the blue backing which corresponds to a position on the weather map at which a desired graphic is to appear, and, so long as the weather person's hand position and timing are correct, the graphic, such as a temperature for a particular city, appears in the composite video. However, with such systems, all graphics to be displayed must be positioned in advance and a sequence must be created which cannot be dynamically changed by the weather person other than, perhaps, to skip through or to the end of a particular preprogrammed sequence.

With the invented system, since a signal is generated specifying a precise point in the foreground video scene identifying a position the weather person is pointing at, as represented by a reflective element, graphics can be repositioned as desired by the weather person or lines or other graphic elements can be generated which track the movement of the reflective element.

Another possible use of the invented system is by a football analyst who can diagram a play showing the movement of various players by moving the reflective element across a frame of a background video scene of the playing field with the players lined up at the beginning of the play.

DETAILED DESCRIPTION OF THE INVENTION

Figure 1:
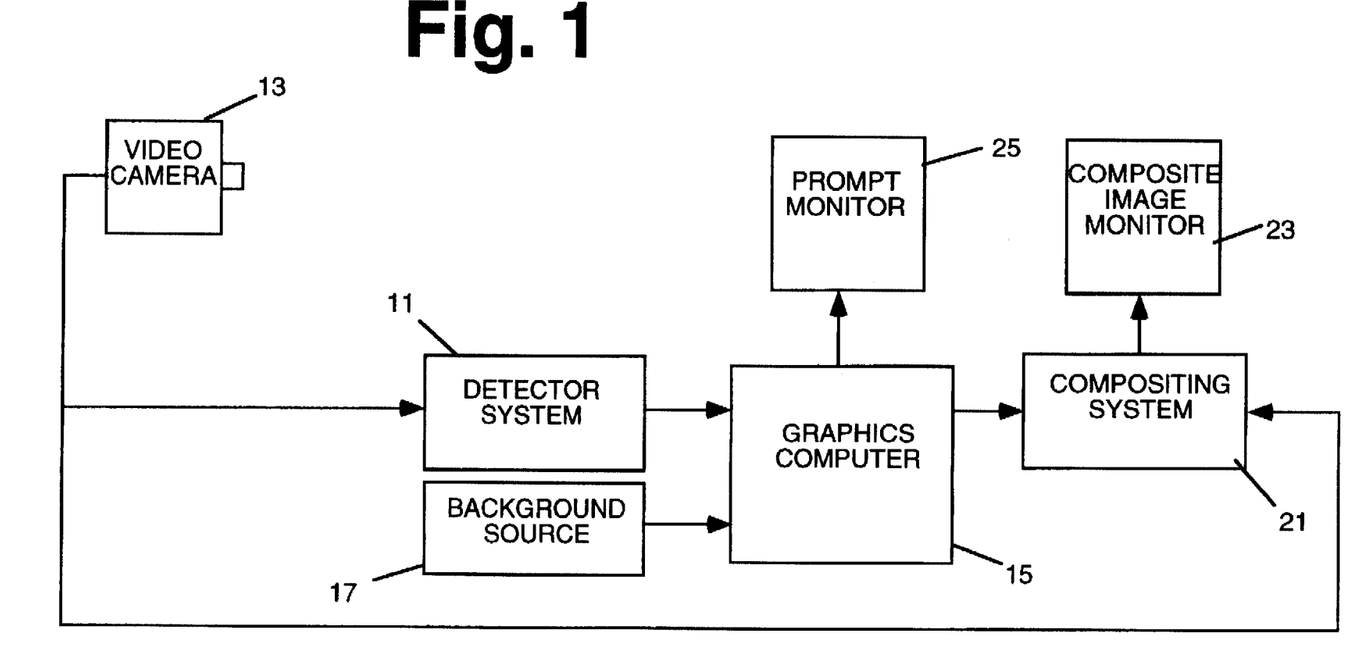
FIG. 1 is a block overview diagram showing a system in which the present invention may be utilized.

Referring to FIG. 1, the present invention is shown as detector system 11 which, along with video camera 13, are all that are needed to practice the invention. However, for completeness, FIG. 1 shows other elements which would be utilized in conjunction with the invented system to provide composite images as described above. These additional elements include a graphics computer 15 which by itself or from a background source 17 provides a background video to compositing system 21. The background video includes the video from the background source or a video image preprogrammed into the graphics computer, plus graphics created by the graphics computer based upon inputs from the detector system. The compositing system 21 makes a composite image of the background image including graphics superimposed on the background image by the graphics computer along with the foreground video from video camera 13. The superimposed graphics are generated as a result of inputs from the detector system. The composite image created by compositing system 21 is displayed on composite image monitor 23. Also shown is prompt monitor 25 which typically would display text for prompting the talent in the foreground scene as to the next element which will be appearing in the background.

Figure 2:
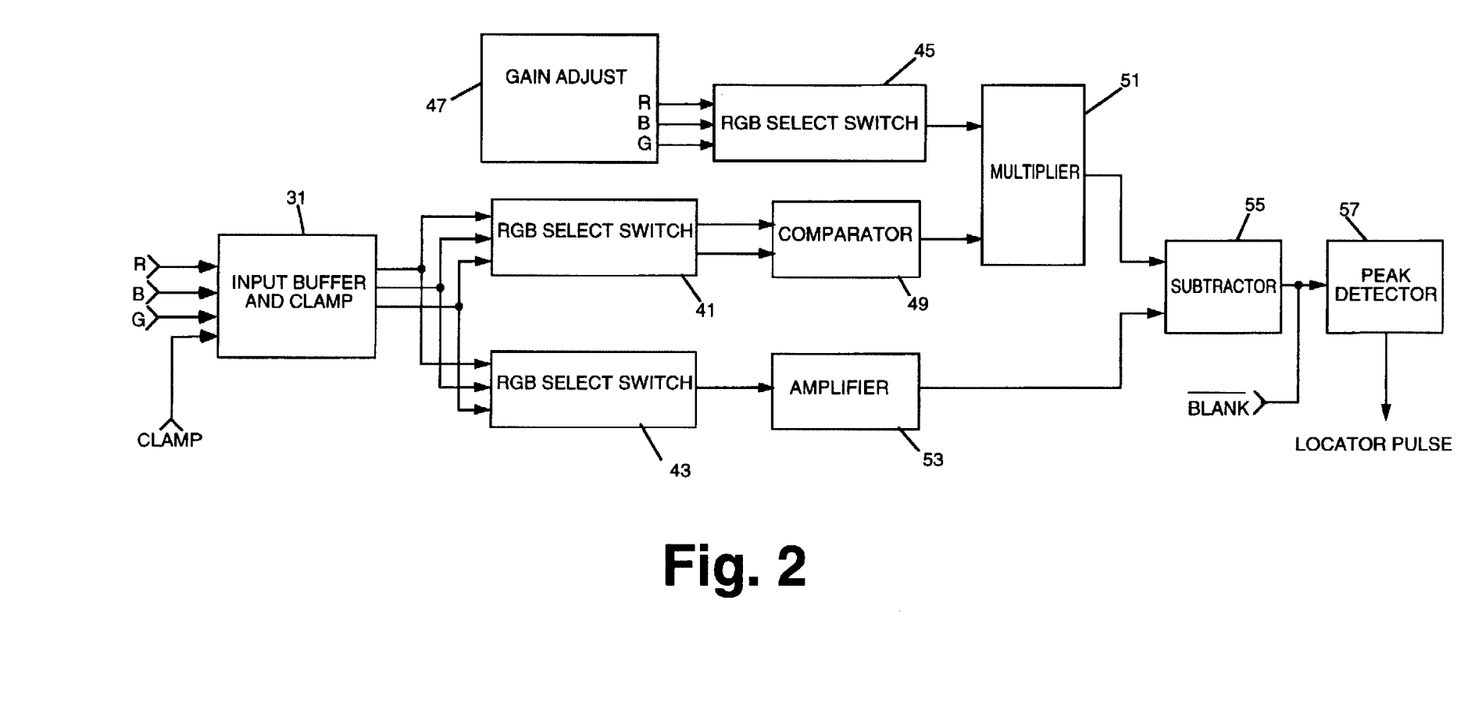
FIG. 2 is a block diagram of a portion of the invented detector system.
Figure 3:
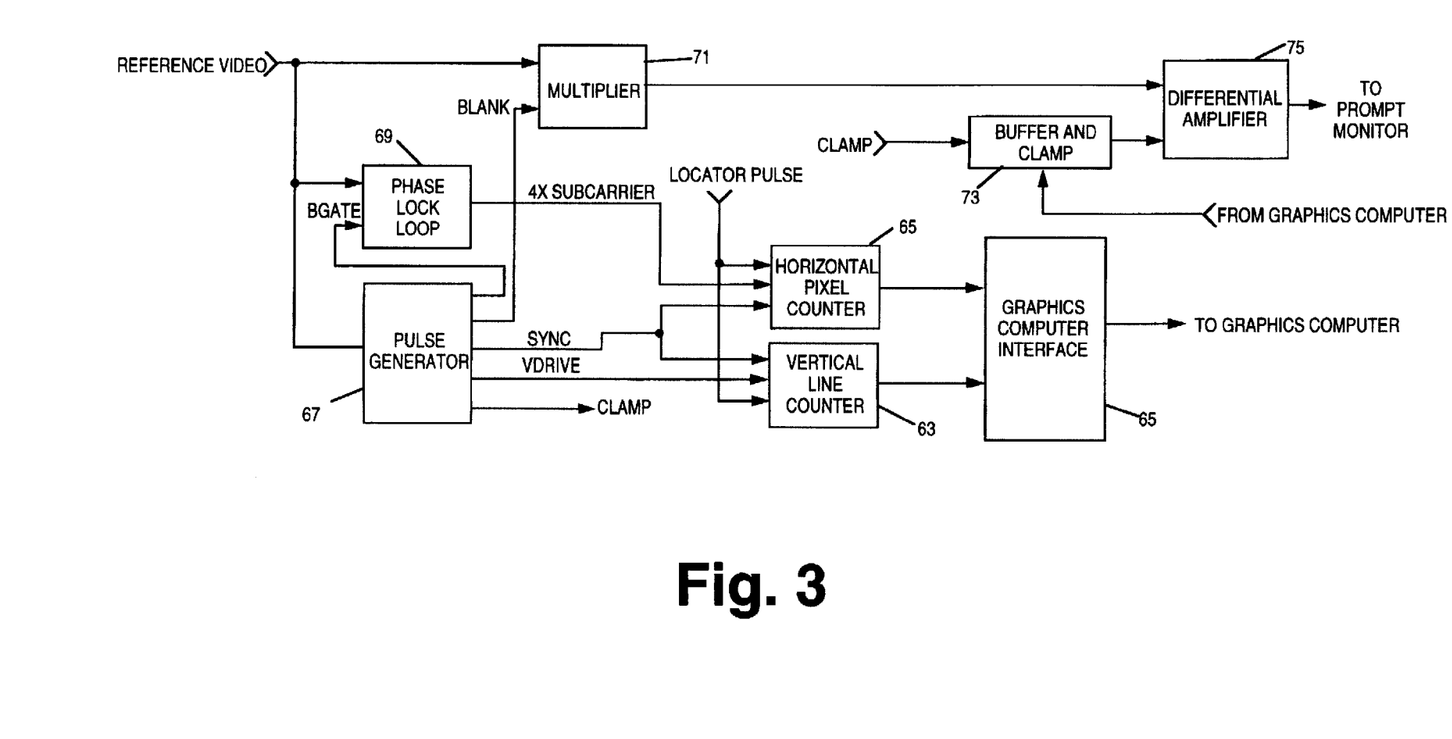
FIG. 3 is a block diagram of the remaining portion of the invented detector system.
Figure 4:
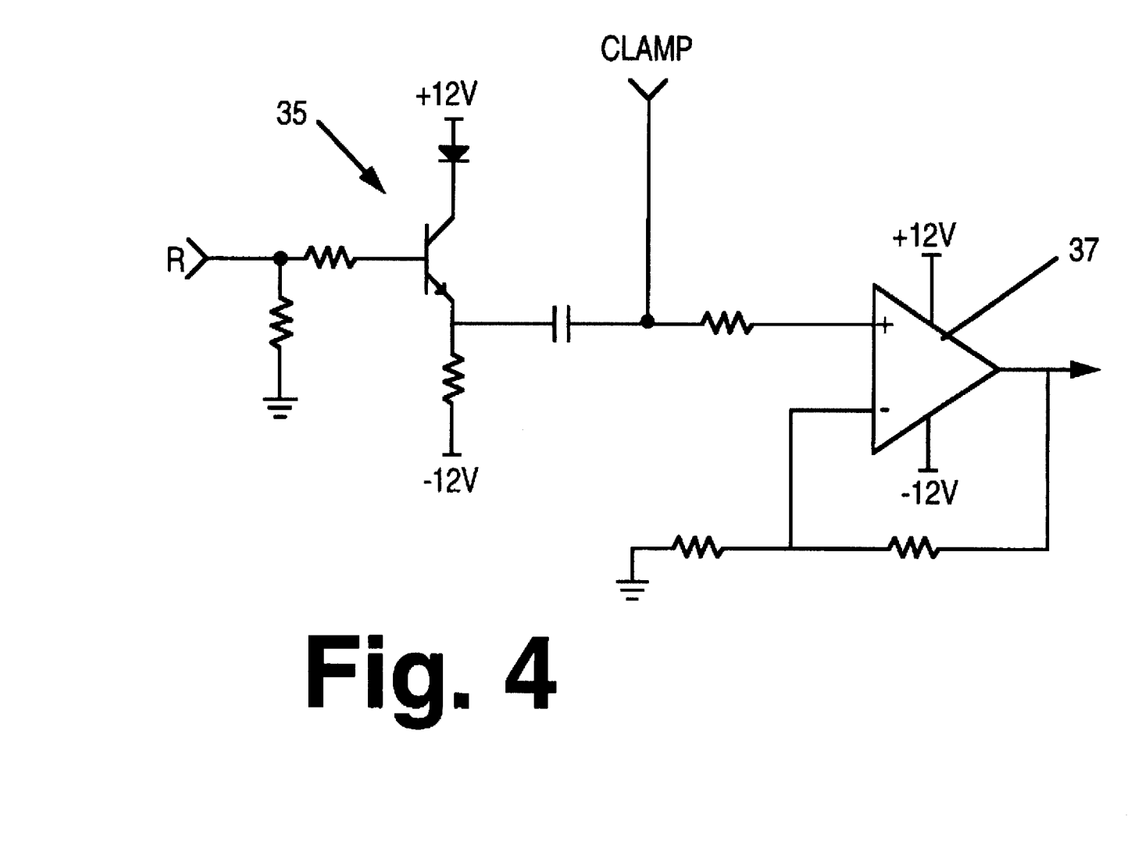
FIG. 4 is a circuit diagram of a single input buffer and clamp represented by block 31.

The invented detector system 11 is shown in block diagram form in FIGS. 2 and 3. Referring first to FIG. 2, video camera 13 generates a conventional red, blue and green (RBG) signal containing the foreground video which is then input to an input buffer and clamp 31. Also input to input buffer and clamp 31 is a clamp signal generated by a pulse generator as will be described below with reference to FIG. 3. There is a separate input buffer and clamp for each of the RBG signals, and FIG. 4 illustrates a suitable input buffer and clamp for one of the components, namely red or R. As is shown in FIG. 4, each input buffer and clamp comprises a transistor buffer 35 and operational amplifier 37. The three buffered and clamped signals are input into RBG select switch 41 and RBG select switch 43. These two switches, as well as RBG select switch 45 are set to select the R, B and/or G component of the input signal depending upon the color of a reflective element being used as a pointer in the foreground video scene. RBG select switches 43 and 45 pass the video signal representing the component corresponding to the color of the reflective element. RBG select switch 41 passes the two components corresponding to the two colors other than the color of the reflective element. For example, for a blue reflective element, RBG select switch 43 and RBG select switch 45 will pass the blue component of the RBG signal input to the switch, while RBG select switch 41 will pass the red and green components of the inputted RBG signal.

Gain adjust 47 is a set of three potentiometers which provide a level for gain adjust so that the signal level produced and selected by RBG select switch 45 is at the same level as the signal generated by the colored reflective element. In other words, for proper operation, where the video information from camera 13 is solely from the reflective element, the outputs of RBG select switch 43 and RBG select switch 45 must be the same for proper operation of subtractor 55. (Amplifier 53 and multiplier 51 provide the same amplification of their inputs.) Comparator 49 compares the two outputs from RBG select switch 41 and outputs the higher one to multiplier 51. Assuming a blue reflective element, comparator 49 outputs the higher of red or green. Multiplier 51 uses the input from comparator 49 and the input from RBG select switch 45 to amplify the output from comparator 49 as a function of the value provided by switch 45. Amplifier 53 amplifies the signal from RBG select switch 43, which will always be the component from the RBG signal corresponding to the color of the reflective element, i.e., blue for a blue reflective element. Subtractor 55 then subtracts the output from amplifier 53 from the output of multiplier 51 to provide a signal which can then be examined by peak detector 57 to determine whether a peak in the video signal is present, which peak corresponds to the position of the reflective element in the video field.

In essence, elements 31, 41, 43, 45, 47, 49, 51, 53 and 55 generate a signal which may be represented by the following equation: B-k(G/R)$^+$, where B represents the level of the component corresponding to the color of the reflective element in a fully illuminated area, (G/R)$^+$represents the highest of the other two components and k is a constant determined by the setting of the selected potentiometer output by switch 45. This equation is known in the art in the art and is used in video compositing devices where the B in the equation represents the color of the backing in the foreground video. See, for example, U.S. Pat. No. 4,100,569. Normally, in the prior art, the signal output by subtractor 55 is used as a control signal to control the compositing of foreground and background images. For example, when the signal is equal to 1, meaning that the backing color is being received by camera 13 at full intensity, then the backing is replaced in the foreground signal with the background source. On the other hand, as the signal approaches zero, meaning that an object in the foreground video source is blocking reception of any light reflected off the backing, then only the foreground component is passed to the composite image. At intermediate points, meaning that some of the light from the backing is passing through the foreground image (for example, if the foreground object is translucent), then the composite image is mixture of the background source and foreground in a ratio determined by the value represented by the control signal.

However, in the present invention, the signal from subtractor 55, instead of being used as a control signal to control the compositing of foreground and background images, is input to peak detector 57.

Peak detector 57 generates a pulse whenever the signal input to the pulse detector is at a maximum level for the current video field being scanned so long as the scan is not in the blanking area.

The pulse detector operates as follows. First, a relatively small object is created and painted or otherwise colored a single color. Although adequate results can be obtained from almost any solid color, preferably, the color is selected from one of red, blue or green, with a different color than the backing, which color is as pure as possible. However, it should be noted that adequate results can be obtained even if the object is the same color as the backing, so long as it is bluer than the blue of a blue backing, redder than the red of a red backing, or greener than the green of a green backing. Additionally, preferably the object should be spherical in shape and capable of being held in the hand of the talent utilizing the object. The reason a spherical shape is preferred is that the peak detector can discriminate a single point in each video frame at which to generate the pulse. If, for example, a cylindrical object were used, and it were held with one end higher than the other at one time and then the other end were higher at a time shortly thereafter, first one end would generate a peak and then the other end would generate a peak which would cause in a discontinuity in the points representing the position of the object. Of course, there may be applications when a shape other than a spherical shape may be desirable, but assuming that it is desired that only a single point which will not move large amounts between fields generate a pulse, then a spherical shape should be used.

Figure 5:
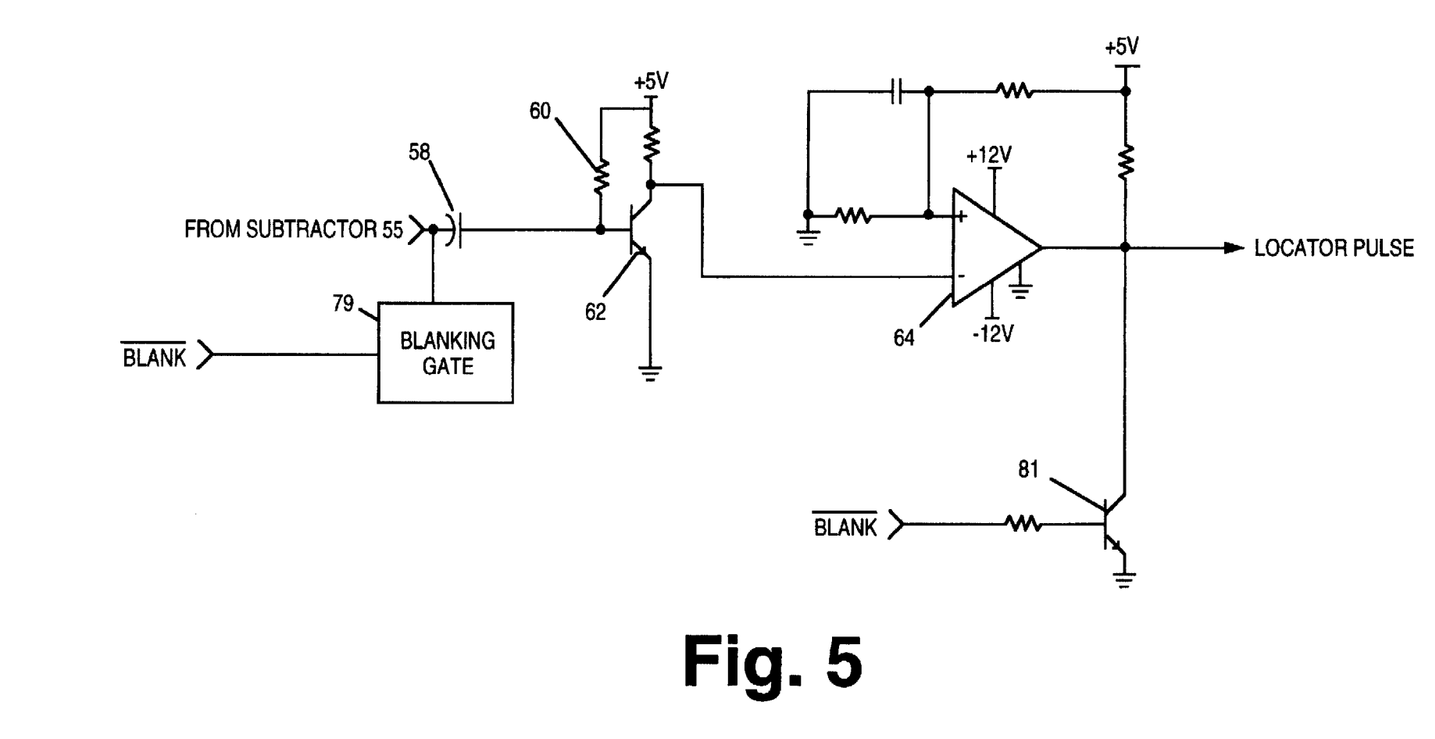
FIG. 5 is a circuit diagram of peak detector 57.

FIG. 5 shows the details of a circuit suitable for implementation of peak detector 57. The output of subtractor 55 (see FIG. 3) is input to a capacitor 58 which along with resistor 60 form an RC time constant equal to about 500 ms. to eliminate false peaks which may be generated when the reflective element is moved rapidly over a relatively large distance through light gradients or briefly obscured. Of course, if necessary, the time constant can be changed as needed for the application. Transistor 62 operates as an inverting amplifier with capacitor 58 holding the highest voltage it has received for each pair of frames so that as the input signal swings up to a peak it saturates transistor 62 and charges the capacitor. Subsequent swings up to a peak are not recognized since they do not saturate transistor 62 due to the charging provided by capacitor 58 unless they surpass the previous highest peak. Comparator 60 operates to square up the pulse from transistor 62 generating the Locator pulse for subsequent use by the digital circuitry used for counters 63 and 65. Noise or other information in the blanking areas do not affect the peak detector since if the scan is in the blanking area, the signal BLANK turns transistor 79 and blanking gate 81 on so that any information in the blanking area does not cause a pulse to be generated. Blanking gate 79 simply grounds the signal from subtractor 55 whenever BLANK is active.

FIG. 3 illustrates the remaining elements needed to implement detector system 11. The circuits represented by FIG. 3 require a reference video signal which is a standard signal available at all broadcasting facilities. The signal is also known as "house black" and is connected to all pieces of video equipment and is used to insure the proper synchronization of all video equipment. The referenced video signal is input to a pulse generator 67 and phase lock loop 69 which together generate the signal 4X Subcarrier, Bgate, Sync, Vdrive, Clamp and Blank, which signals are all well known to video engineers. The details regarding the generation of such signals and implementation of pulse generator 67 and phase lock loop 69 are well known to persons skilled in the field of the invention. The 4X Subcarrier signal is a pulse train operating at about 14.32 MHz for an NTSC signal such that each pulse corresponds to a single pixel on a horizontal scan line, there being about 760 pixels per scan line. The Vdrive signal is another pulse train that pulses at the beginning of each video field. The Sync signal is a pulse transmitted at the start of each video scan line. The Clamp signal is a signal derived from the rising edge of Sync at the end of the color burst component of the video signal at the beginning of the active video portion of the signal when the video signal is at DC ground. The Blank signal is the composite blanking signal which defines the area of active video. The Bgate signal is the color burst gate signal which allows phase lock loop 69 to lock to the phase and frequency of the color burst.

Multiplier 71, buffer and clamp 73 and differential amplifier 75 are shown for completeness and are used in conjunction with the present invention to generate a signal to be displayed on prompt monitor 25 (FIG. 1) and to prompt the talent as to the next item which will be generated by the background source. However, the details regarding such circuits and their operation are not necessary for an understanding of the present invention.

Figure 6:
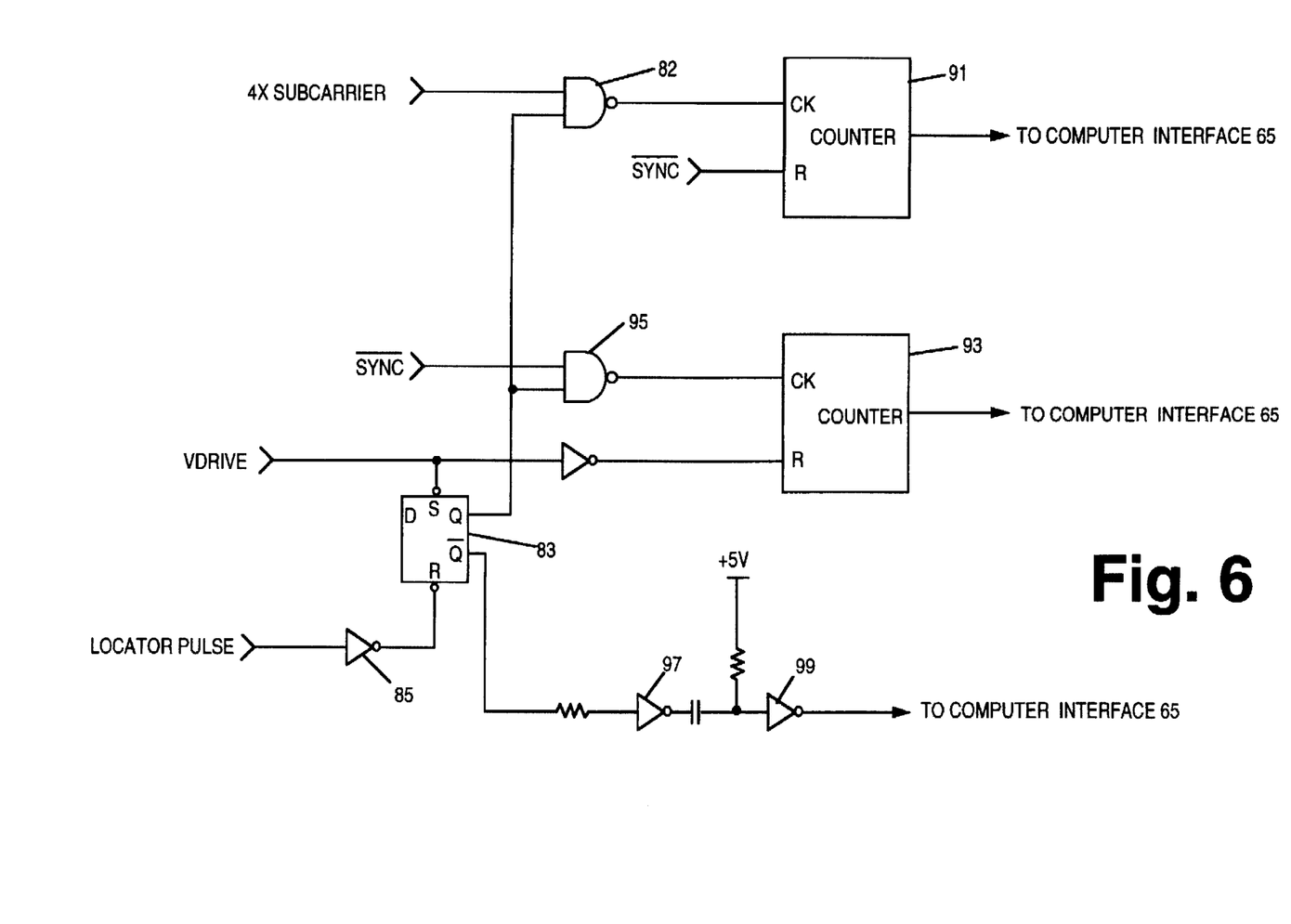
FIG. 6 is a circuit diagram of horizontal pixel counter 61 and vertical line counter 63.

Vertical line counter 63 and horizontal pixel counter 65 generate outputs which specify the line and pixel on a horizontal scan line within adjacent video frames representing the position of the highest peak generated within those frames. These two counters also generate a signal indicating that the line and pixel position represented by the counters are in a steady state condition and are ready for use by graphics computer 65. Further details regarding the operation of vertical line counter 63 and horizontal pixel counter 65 are set forth below with reference to FIG. 6. The information provided by vertical line counter 63 and horizontal pixel counter 65 is input to graphics computer interface 65 which makes such information available in a form usable by graphics computer 15. In a preferred embodiment, graphics interface 65 includes its own processor programmed to perform a curve fitting algorithm on the points generated by counters 63 and 65 to smooth the line created by such points. Such smoothing is desirable to compensate for jerky movements of the reflective object or to compensate for imprecise reflections of light off the object when it is held at different angles or different positions relative to the light source causing the peak to be generated at different positions on the object. Details regarding interface 65, including the implementation of a curve fitting algorithm depend upon the particulars of graphics computer 15, the curve fitting algorithm and processor used, and should be readily apparent to persons skilled in the relevant art. Referring now to FIG. 6, the 4X Subcarrier is input to NAND gate 82. The other input to NAND gate 82 is the Q output of RS flip-flop 83 which is set at the beginning of each video field by the signal Vdrive. The Locator pulse from peak detector 57 is input to inverter 85 which is coupled to the reset of RS flip-flop 83. Counter 91 is reset at the beginning of each scan line by the signal $\overline{\text{Sync}}$. Counter 91 counts the horizontal pulses from the signal 4X Subcarrier. Counter 93 is reset at the beginning of each video field by the signal Vdrive. $\overline{\text{Sync}}$ is also input to NAND gate 95 which causes counter 93 to count each vertical line in a field of video. Vdrive sets flip-flop 83 starting counters 91 and 93. The $\overline{Q}$ output of flip-flop 83 is enabled whenever the Locator pulse is active causing NAND gates 81 and 95 to stop passing the 4X Subcarrier and $\overline{\text{Sync}}$ signals thereby stopping counters 91 and 93 at a count identifying the horizontal and vertical positions of the highest peak detected by peak detector 57. After a short delay created by inverters 97 and 99 to allow counters 91 an 93 to reach steady-state, the fact of the existence of the Locator pulse is transmitted to computer interface 65. Since a peak may be generated as the video scan is taking place, meaningful information is not provided by the Locator pulse until the reflective element is at a location where it can be scanned. Once the reflective element is at a location where it can be scanned, then the Locator pulse will accurately indicate its location. In this connection, in the preferred embodiment, it is necessary that a signal be created to indicate to the graphics computer 15 that the reflective element is within the reflective field. This signal can be generated in any convenient way. For example, the talent in the foreground video can depress a switch causing an RF signal to be generated which signal can be received, converted to digital form and passed to computer 15. In this manner, when computer 15 interrogates location data available at interface 65, such data will accurately reflect the location of the reflective element within the video field.

I claim:

1. A system for determining and tracking the location of a moving reflective object in real time having a predetermined color within a field of video information having red, blue, and green components comprising:
   a) means adapted for receiving and clamping the video information from a single video camera, for comparing the component of said video signal corresponding to the color of said reflective object to the other components of said video information, and for generating a signal representing the results of said comparison;
   b) peak detector means coupled to said comparing means for generating a pulse each time said signal representing the results of said comparison is greater than a prior comparison within a predetermined window of time;
   c) first counter means coupled to said peak detector means for counting the number of pixels within each horizontal scan line within said field of video; and
   d) second counter means coupled to the peak detector means for counting the number of scan lines within said field of video, the first and second counter means adapted to stop counting each time said pulse is generated;

wherein the number in the first counter means represents the reflective object's horizontal location within the field;

wherein the number in the second counter means represents the reflective object's vertical location within the field.

2. The system in claim 1 further comprising:
   a graphics interface, coupled to the first and second counter means and a graphics processor for controlling the transmission of information to the graphics computer from the first and second counter means.

3. The system in claim 2 wherein the graphics processor is adapted to receive a background source and the output of the first and second counter means and to superimpose at least one graphic image onto a background video from the background source at a location determined by the numbers stored in the first and second counter means.

4. The system in claim 3 wherein the video camera is coupled to the receiving/comparing/generating means and a compositing system, for providing a foreground video including the video information of the reflective object.

5. The system in claim 4 wherein the compositing system, coupled to the graphic processor, generates a composite image of the background video, at least one graphic image, and the foreground video from the video camera.

6. A system for determining and tracking the location of a moving reflective object in real time having a predetermined color within a field of video information having red, blue, and green components comprising:
   a) receiving means for receiving and clamping the video information from a single video camera;
   b) first switching means coupled to said receiving means for passing said video information corresponding to the color of said reflective object;
   c) second switching means coupled to said receiving means for passing remaining components of said video information other than component of said video information corresponding to the color of said reflective object;
   d) comparing means coupled to said second switch means for comparing said remaining components of said video information and generating a signal representing the results of said comparison;
   e) multiplying means coupled to said comparator means for multiplying said signal with k wherein k is a predetermined constant and generating a second signal representing the results of said multiplication;
   f) subtracting means coupled to said multiplier means for receiving said second signal and coupled to said first switch means for receiving said video information corresponding to the color of said reflective object and generating a third signal representing the results of said subtraction;

g) peak detector means coupled to said subtractor means for generating a pulse each time said signal representing the results of said comparison is greater than a prior comparison within a predetermined window of time;

h) first counter means coupled to said peak detector means for counting the number of pixels within each horizontal scan line within said field of video; and i) second counter means coupled to the peak detector means for counting the number of scan lines within said field of video, the first and second counter means adapted to stop counting each time said pulse is generated;

wherein the number in the first counter means represents the reflective object's horizontal location within the field and the number in the second counter means represents the reflective object's vertical location within the field.

7. The system defined in claim 6 wherein the receiving means comprises at least one transistor buffer coupled to at least one operational amplifier.

8. The system defined in claim 6 wherein the first switching means is a RGB select switch.

9. The system defined in claim 6 wherein the second switching means is a RGB select switch.

10. The system defined in claim 6 wherein the comparing means is a comparator.

11. The system defined in claim 6 wherein the multiplying means comprises at least one potentiometer coupled to a RGB select switch, the RGB select switch coupled to a multiplier.

12. The system defined in claim 6 wherein the subtracting means is a subtractor.

13. The system defined in claim 6 wherein the peak detector means comprises a RC circuit for eliminating false peaks that is generated when the reflective object is moved rapidly over a distance.

14. The system defined in claim 13 wherein the RC circuit has a RC time constant equal to 500ms.

\* \* \* \* \*

UNITED STATES PATENT AND TRADEMARK OFFICE
CERTIFICATE OF CORRECTION

PATENT NO. : 5,699,442
DATED : December 16, 1997
INVENTOR(S) : Fellinger

It is certified that error appears in the above-identified patent and that said Letters Patent is hereby corrected as shown below:

<u>Title page,</u>
Item [21], Application Number, please replace "527,095" and insert -- 08/527,095 --.
Item [63], Related U.S. Application Data, please delete "Ser. No. 867,048" and insert -- Ser. No. 07/867,048 --.

Signed and Sealed this

Twenty-sixth Day of February, 2002

Attest:

JAMES E. ROGAN
Attesting Officer       Director of the United States Patent and Trademark Office